United States Patent

Kikuchi et al.

[11] Patent Number: 5,985,978
[45] Date of Patent: Nov. 16, 1999

[54] RUBBER COMPOSITION FOR TIRE TREAD

[75] Inventors: Yasushi Kikuchi; Toru Nakamura; Hiroyuki Saito; Katsuki Hayashida, all of Hiratsuka, Japan

[73] Assignee: The Yokohama Rubber Co., Ltd., Tokyo, Japan

[21] Appl. No.: 09/046,655

[22] Filed: Mar. 24, 1998

[30] Foreign Application Priority Data

Mar. 31, 1997 [JP] Japan .................................. 9-080169

[51] Int. Cl.$^6$ ...................................................... C08K 3/00
[52] U.S. Cl. ............................................ 524/495; 525/496
[58] Field of Search ...................................... 524/495, 496

[56] References Cited

U.S. PATENT DOCUMENTS 5,877,251  3/1999  Sant ........................................ 524/496

*Primary Examiner*—Edward J. Cain
*Attorney, Agent, or Firm*—Nikaido, Marmelstein, Murray & Oram LLP

[57] ABSTRACT

A rubber composition for a tire tread comprising 100 parts by weight of a diene rubber and 35 to 60 parts by weight of a carbon black having a nitrogen specific surface area ($N_2SA$) of 120–150 m$^2$/g, a 24M4DBP of 95–110 ml/100 g, an $N_2SA/IA$ of 0.95–1.05, a $\Delta Dst$ of less than 70 nm, a Tint of more than 130, and a toluene discoloration (T%) of not less than 70% but less than 80%.

4 Claims, No Drawings

RUBBER COMPOSITION FOR TIRE TREAD

BACKGROUND OF THE INVENTION

1. Field of the Invention

The present invention relates to a rubber composition for a tire tread. More specifically, it relates to a rubber composition for a tire tread, especially suitable for use as a large sized tire such as a truck or bus, having a remarkably improved balance of heat generation resistance, processability and abrasion resistance.

2. Description of the Related Art

In rubber compositions for large sized tires such as those for trucks and buses, rubber composition for tire treads containing carbon blacks having a small particle size, such as ISAF-SAF class carbon blacks to improve the abrasion resistance.

However, these rubber compositions containing such carbon blacks have problems that the abrasion resistance and the processability become worse. To solve these problems, many proposals containing carbon blacks such as those having small particle sizes, improved surface activities, aggregate forms, etc. have been made (see, e.g., JP-A-64-74242, JP-A-63-264647, JP-A-3-121165, JP-A-2-77445, JP-A-2-140244, JP-A-2-286727).

However, when the above-proposed carbon blacks are compounded into rubber compositions, the abrasion resistance, the heat generation resistance and the processability are not sufficiently improved.

Accordingly, the present inventors tried to optimize the below-mentioned characteristics of carbon blacks, mainly to improve the abrasion resistance in view of the heat generation resistance and the processability. As a result, it was found that the preferable carbon blacks can be obtained when carbon blacks have a particle size equal to those of general SAF class, a sharp ΔDst and a high Tint for the abrasion resistance, when the surface activities, especially toluene discoloration (T%), are optimized for the heat generation resistance, and when carbon blacks are low structured and T% and $N_2SA/IA$ ratio are optimized.

SUMMARY OF THE INVENTION

Accordingly, the object of the present invention is to provide a rubber composition for a tire tread having an excellent balance of the heat generation resistance, processability and abrasion resistance.

In accordance with the present invention, there is provided a rubber composition for a tire tread comprising 100 parts by weight of a diene rubber and 35 to 60 parts by weight of a carbon black having a nitrogen specific surface area ($N_2SA$) of 120–150 $m^2/g$, a 24M4DBP of 95–110 ml/100 g, an $N_2SA/IA$ of 0.95–1.05, a ΔDst of less than 70 nm, a Tint of more than 130, and a toluene discoloration (T%) of not less than 70% but less than 80%.

DESCRIPTION OF THE PREFERRED EMBODIMENTS

The present invention will now be explained in detail regarding the constitutions and the functional results thereof.

The diene rubbers usable in the present invention include any diene rubbers generally or conventionally compounded in rubber compositions for tire treads. Examples of such diene rubbers are natural rubber (NR), polyisoprene rubber (IR), various styrene-butadiene copolymer rubbers (SBR), various polybutadiene rubbers (BR), acrylonitrile-butadiene copolymer rubbers (NBR), etc. These diene rubbers may be used alone or in any blend thereof. Preferably, the natural rubber is contained in an amount of 60 parts by weight or more based upon 100 parts by weight of the total diene rubber. In addition, ethylene-propylene copolymer rubbers (EPR, EPDM) and butyl rubbers (IIR) etc. may be blended, as a minor component, in the diene rubber.

The carbon blacks usable in the present invention include, in view of the desired characteristics of the rubber composition, those having an $N_2SA$ of 120–150 $m^2/g$, preferably 130–145 $m^2/g$, a 24M4DBP of 95–110 ml/100 g, preferably 98–106 ml/100 g, an $N_2SA/IA$ of 0.95–1.05, a ΔDst of less than 70 nm, a Tint of more than 130, preferably 135 or more, and a toluene discoloration (T%) of not less than 70% but less than 80%.

When the $N_2SA$ of the carbon black is less than 120 $m^2/g$ or less, the abrasion resistance is not sufficiently improved, whereas the $N_2SA$ is more than 150 $m^2/g$, the heat generally becomes unpreferably high and the processability is also decreased. When the 24M4DBP is less than 95 ml/100 g, the sufficient abrasion resistance cannot be unpreferably obtained and the mixing processability (i.e., the incorporation of the carbon black into the rubber) becomes unpreferably poor. Contrary to this, when the 24M4DBP is more than 110 ml/100 g, the viscosity is increased so that the processability is not preferable, although the abrasion resistance and the heat generation resistance are improved. When the $N_2SA/IA$ ratio of the carbon black is less than 0.95, the surface activity of the carbon black is low, and therefore, the heat generation becomes unpreferably high. Contrary to this, when the $N_2SA/IA$ ratio becomes more than 1.05, the incorporation of the carbon black into the rubber is remarkably poor so that the processing becomes practically difficult, although this is effective for the decrease in the heat generation. Furthermore, when the ΔDst is 70 nm or more, it is not preferable because the sufficient abrasion resistance cannot be obtained and also when the Tint is 130 or less, it is not preferable because the sufficient abrasion resistance is not sufficient. Furthermore, when the toluene discoloration (T%) is less than 70%, the mixing processability is not preferable because the incorporation of the carbon black into the rubber becomes worse, although the heat generation becomes low. Contrary to this, when the toluene discoloration (T%) is 80% or more, the heat generation becomes unpreferably high.

According to the present invention, the above-mentioned carbon black is incorporated into the rubber in an amount of 35–60 parts by weight, preferably 45–57 parts by weight, based upon 100 parts by weight of the diene rubber. When the amount of the carbon black is too small, it is not preferable that the abrasion resistance is not sufficiently improved, whereas when the amount of the carbon black is too large, it is not preferable because the durability of the tire is decreased due to the excessive heat generation, although the abrasion resistance is improved.

The carbon black usable in the present invention can be prepared by an oil-furnace method, which now becomes the mainstream of the production of carbon blacks for rubber, and, depending upon the desired characteristics such as the specified $N_2SA$, ΔDst, Tint, toluene discoloration (T%), etc., reaction furnaces, in which the starting oils are uniformly and minutely sprayed, and the production conditions for adjusting the surface activities, etc. are appropriately controlled.

The rubber composition according to the present invention can be produced by compounding the diene rubber, carbon black, etc., in a conventional manner. The rubber composition for a tire tread according to the present invention.

The rubber composition for tire tread according to the present invention may further include various additives conventionally used in rubber compositions for tire tread, etc., such as sulfur, vulcanization accelerators, antioxidants, fillers, softening agents, plasticizers. The rubber composition of the present invention may be vulcanized in a conventional manner to form a tire tread. For example, the amount of sulfur is 0.8 parts by weight or more, preferably 1.0 to 3.0 parts by weight, based upon 100 parts by weight of the rubber component, and the vulcanizing conditions are as in the conventional manner.

EXAMPLES

The present invention will now be further illustrated in detail by, but is by no means limited to, the following Examples.

Standard Example 1, Examples 1–2 and Comparative Examples 1–6

The components, other than the vulcanization accelerator and sulfur, shown in Table I were mixed in a 1.7 liter Banbury mixer for 4 minutes. The resultant mixture was mixed, with the vulcanization accelerator and sulfur, by an 8-inch open roll for 4 minutes. Thus, the rubber composition was prepared.

TABLE I

| Component | Amount (parts by weight) |
| --- | --- |
| Natural rubber (NR)*1 | 100 |
| Carbon black (CB)*2 | 50 |
| Zinc oxide | 3 |
| Stearic acid | 2 |
| Antioxidant*3 | 1 |
| Sulfur | 1.5 |
| Vulcanization accelerator*4 | 1.0 |

*1: SMR L
*2: See Table II
*3: N-1,3-dimethylbutyl-N'-phenyl-p-phenylenediamine
*4: N-tert-butyl-2-benzothiazole-sulfenamide The formulations, other than the carbon black, in Standard Example 1, Examples 1–2 and Comparative Examples 1–6 are the same, except that the types of carbon blacks are changed as shown in Table II. The characteristics of the carbon blacks are determined as follows.

Analytical Methods of Characteristics of carbon black.

$N_2SA$ (m$^2$/g): according to ASTM D3037-86 method.

IA (i.e., iodine absorption) (mg/g), Tint, and toluene discoloration (T%): according to JIS (i.e., Japan Industrial Standards) K 6221-1982 method. 24M4DBP (ml/100 g): according to ASTM D3493 method.

ΔDst (nm): determined by a centrifugal sedimentation method using a disc centrifuge manufactured by JOIS-Lable Co. as follows.

That is, carbon black dried by a JIS K6221 (1982) method and accurately weighed was mixed with a 20% aqueous ethanol solution to adjust the concentration of the carbon black to 0.005% by weight, followed by ultrasonically sufficiently dispersing to provide a sample. On the other hand, the revolution speed of the Disc Centrifuge was set to 8000 rpm and, after adding 10 ml of a spin liquid (distilled water) to the Disc Centrifuge, followed by adding thereto 0.5 ml of a buffer solution (a 20 vol % aqueous ethanol solution). Then, 0.5–1.0 ml of a sample solution was added thereto with a syringe and a centrifugal sedimentation was started to prepare the aggregate distribution curve with a photoelectric sedimentation method, from which curve the distribution value of the aggregate at the ½ of the most frequency in the curve was made the half peak width ΔDst.

Carbon black used in Examples

Standard Example 1: N110 (Diablack A available from Mitsubishi Chemical Co.)

Example 1: Carbon black of the present invention

Example 2: Carbon black of the present invention

Comparative Example 1: N220 (Showblack N220 available from Showa Cabot Co.)

Comparative Example 2: N339 (Seast KH available from Tokai Carbon Co.)

Comparative Example 3: ISAF

Comparative Example 4: SAF

Comparative Example 5: SAF

Comparative Example 6: ISAF

The rubber composition was press-vulcanized at 150° C. for 30 minutes to prepare the desired test specimen to evaluate the following physical properties.

The results are shown in Table II.

1) Heat Generation Resistance

The heat generation resistance was determined at 100° C. under the conditions of a strain rate of 10±2% in extension deformation, and a frequency of 20 Hz, using a viscoelastic spectrometer manufactured by Iwamoto Seisaku-sho. The smaller the tan δ value at 100° C., the smaller the heat generation and, when used as a tire, the durability of the tire is good. The results were shown as indexes using the value of Standard Example 1 as 100. The smaller the index value, the better the result.

2) Abrasion Resistance

The abrasion resistance was determined, using a Lambo-rne abrasion tester, according to a JIS K6264 method, as follows. (Abrasion Amount of Standard Example 1)×100/(Amount of Abrasion of Sample) Thus, the results were shown as indexes using the value of Standard Example 1 as 100. The larger the index value, the better the result.

3) Processability

The sample rubber composition was mixed in a 1.7 liter closed type mixer such as Banbury type mixer for 4 minutes and the discharged rubber was visually evaluated from the integrated mass of the rubber and the amount of the powdery carbon black retained without introduced into the rubber.

| Score | State |
| --- | --- |
| 1 | The rubber after discharged are crumbled and the dispersion of carbon black is clearly poor by the naked eyes. |
| 2 | The integrated mass of the rubber is rather poor and the powder carbon blacks are retained. |
| 3 | Although the integrated mass of the rubber is excellent, but the carbon black in the form of a powder is retained. |
| 4 | The integrated mass of the rubber is good and the carbon black in the form of a powder is not retained. |

The larger the value, the better the processability.

TABLE II

| Example No. | Standard Example 1 | Comparative Example 1 | 2 | 3 | 4 | 5 | 6 | Example 1 | 2 |
|---|---|---|---|---|---|---|---|---|---|
| Type of Carbon | N110 | N220 | N339 | ISAF | SAF | SAF | ISAF | Present carbon-1 | Present carbon-2 |
| Characteristics of Carbon | | | | | | | | | |
| $N_2SA$ (m$^2$/g) | 142 | 113 | 93 | 112 | 147 | 147 | 125 | 144 | 135 |
| IA (mg/g) | 140 | 117 | 90 | 98 | 144 | 151 | 128 | 143 | 135 |
| $N_2SA/IA(-)$ | 1.01 | 0.96 | 1.03 | 1.14 | 1.02 | 0.97 | 0.98 | 1.01 | 1.00 |
| 24M4DBP (ml/100 g) | 100 | 96 | 101 | 94 | 105 | 97 | 105 | 103 | 105 |
| ΔDst (nm) | 73 | 58 | 67 | 61 | 54 | 51 | 68 | 60 | 59 |
| Tint | 115 | 120 | 110 | 119 | 126 | 133 | 120 | 138 | 136 |
| Toluene Discoloration (T %) | 98 | 98 | 89 | 79 | 91 | 82 | 67 | 75 | 77 |
| Properties of Vulcanizate | | | | | | | | | |
| Heat Resistance (Index) | 100 | 96 | 80 | 83 | 90 | 104 | 97 | 95 | 90 |
| Abrasion Resistance (Index) | 100 | 85 | 75 | 85 | 102 | 110 | 96 | 113 | 108 |
| Processability | 3 | 4 | 4 | 1 | 2 | 3 | 2 | 3 | 3 |

Then, various rubber compositions shown in Table II were used to produce a tire for truck having a rib pattern of 1000R20 14PR and the tires were tested by an actual drive in a course of 100% good conditioned road. After about $5 \times 10^4$ km running, the running distance capable of running during 1 mm decrease of the depth of groove was calculated from the measurement of the retained depth of groove. The result is shown as the index for the abrasion resistance after actual running as follows.

$$(\text{Running distance of Sample}) \times 100 \bigg/ \frac{1}{(\text{Running Distance of Standard Example 1})}$$

The results are shown in Table III.

TABLE III

| Tread Rubber | Standard Example 1 | Comparative Example 1 | Example 1 |
|---|---|---|---|
| Abrasion Resistance for Actual Running (Index) | 100 | 89 | 115 |

As is clear from the results shown above, the rubber composition, according to the present invention, for tire tread is excellent in the heat generation resistance and the abrasion resistance and is comparable in the processability, when compared with those of Standard Example 1 containing carbon black N110. Especially in the abrasion resistance for the actual running test, the large improvement in the abrasion resistance was confirmed. Contrary to this, when carbon blacks N220 and N339 were used as in Comparative Examples 1 and 2, the abrasion resistance is poor although the processability and the heat generation resistance are good. Furthermore, when carbon blacks ISAF and SAF as in Comparative Examples 3 and 4, the processability (i.e., the incorporation of the carbon black into the rubber) were poor and Comparative Example 3 was poor in the abrasion resistance. Furthermore, Comparative Example 5 is poor in the heat generation resistance and there are problems for both the abrasion resistance and the processability. The Comparative Example 6 has the problems in the abrasion resistance and the processability.

We claim:

1. A rubber composition for a tire tread comprising 100 parts by weight of a diene rubber and 35 to 60 parts by weight of a carbon black having a nitrogen specific surface area ($N_2SA$) of 120–150 m$^2$/g, a 24M4DBP of 95–110 ml/100 g, an $N_2SA/IA$ of 0.95–1.05, a ΔDst of less than 70 nm, a Tint of more than 130, and a toluene discoloration (T%) of not less than 70% but less than 80%.

2. A rubber composition as claimed in claim 1, wherein the diene rubber is composed of 60% by weight or more of natural rubber and 40% by weight or less of the other diene rubber.

3. A rubber composition as claimed in claim 1, wherein the carbon black has an $N_2SA$ of 130–145 m$^2$/g, a 24M4DBP of 98–106 ml/100 g, an $N_2SA/IA$ of 0.95–1.05, a ΔDst of 50–65 nm, a Tint of 135 or more.

4. A rubber composition as claimed in claim 1, wherein the amount of the carbon black is 45–57 parts by weight, based upon 100 parts by weight of the diene rubber.

* * * * *